United States Patent
Hayzen

(10) Patent No.: US 10,607,470 B2
(45) Date of Patent: Mar. 31, 2020

(54) VIBRATIONAL ANALYSIS SYSTEMS AND METHODS

(71) Applicant: Computational Systems Inc., Knoxville, TN (US)

(72) Inventor: Anthony John Hayzen, Knoxville, TN (US)

(73) Assignee: Computational Systems, Inc., Knoxville, TN (US)

( * ) Notice: Subject to any disclaimer, the term of this patent is extended or adjusted under 35 U.S.C. 154(b) by 169 days.

(21) Appl. No.: 15/877,479

(22) Filed: Jan. 23, 2018

(65) Prior Publication Data

US 2019/0228636 A1    Jul. 25, 2019

(51) Int. Cl.

| G08B 21/18 | (2006.01) |
|---|---|
| G08B 5/36 | (2006.01) |
| G08B 3/10 | (2006.01) |
| G01V 1/00 | (2006.01) |
| G01H 1/00 | (2006.01) |
| H02K 11/20 | (2016.01) |

(52) U.S. Cl.
CPC ............. *G08B 21/187* (2013.01); *G01H 1/00* (2013.01); *G01V 1/00* (2013.01); *G08B 3/10* (2013.01); *G08B 5/36* (2013.01); *H02K 11/20* (2016.01)

(58) Field of Classification Search
None
See application file for complete search history.

(56) References Cited

U.S. PATENT DOCUMENTS

| 6,370,957 B1 * | 4/2002 | Filippenko | G01H 1/003 73/593 |
|---|---|---|---|
| 9,678,001 B2 | 6/2017 | Zhao et al. | |
| 2007/0164750 A1 * | 7/2007 | Chen | G01R 31/025 324/527 |
| 2011/0288796 A1 * | 11/2011 | Peczalski | G01H 9/00 702/56 |
| 2013/0096848 A1 * | 4/2013 | Hatch | G01M 13/045 702/39 |
| 2015/0013440 A1 * | 1/2015 | Bianucci | G05B 23/0216 73/112.01 |

OTHER PUBLICATIONS

Normal Distribution, Engineering Statistics Handbook, NIST, https://www.itl.nist.gov/div898/handbook/eda/section3/eda3661.htm (Year: 2013).*

(Continued)

*Primary Examiner* — Roy Y Yi
(74) *Attorney, Agent, or Firm* — Luedeka Neely Group, P.C.; David LaRose; Rick Barnes

(57) ABSTRACT

A system, a hand-held vibration monitor and a method for setting vibrational alarms for machinery. The system includes a vibrational alarm device having a plurality of vibration data inputs from a machinery group, a memory for storing historical vibration data from the machinery group, an accumulator for generating average vibrational data for the machinery group, a processor for selecting a vibration alarm limit based on a cumulative distribution curve of the average vibrational data, and a warning alarm to alert a user that the machinery has reached the vibrational alarm limit when vibration data from a machine in the machinery group reaches the vibrational alarm limit.

18 Claims, 3 Drawing Sheets

(56) References Cited

OTHER PUBLICATIONS

Normal Distribution, Wolfram, http://mathworld.wolfram.com/NormalDistribution.html (Year: 2020).*
http://www.ct-yankee.com/spc/nonnormal.html (Year: 2010).*
Characterizing a Distribution, http://work.thaslwanter.at/Stats/html/statsDistributions.html (Year: 2015).*

* cited by examiner

VIBRATIONAL ANALYSIS SYSTEMS AND METHODS

TECHNICAL FIELD

The disclosure is directed to vibrational analysis systems, devices and methods that provide alarm limits for equipment that enable a reduction of physical monitoring techniques.

BACKGROUND AND SUMMARY

Setting appropriate alarm levels for scalar vibration parameter data is important for automatically identifying potential issues arising with machines being monitored. If reliable alarm levels are established, the amount of time a vibration analyst needs to spend examining data on machines that do not exhibit any operational issues may be significantly reduced. Accordingly, the vibration analyst will be able to focus their valuable time on those machines that have potential issues arising. This is particularly important considering the decreasing number of skilled vibration analysts available to monitor large groups of machinery.

There are several statistical methods for analyzing scalar vibration parameter trend data, the most common being the calculation of a standard deviation. The issue with this approach is that for a reliable or meaningful standard deviation it is assumed that the data forms a normal or Gaussian distribution. However, most scalar vibration trend data fails to follow a normal distribution and therefore, although a standard deviation can be calculated from the data, it is not a reliable representation of the vibration trend data.

An example of a conventional technique for vibrational trend data is illustrated in FIG. 1. FIG. 1 illustrates predicted and actual motor vibrational velocity data in inches per sec (in/sec) for a machine motor. FIG. 1 shows the discrepancy between the actual scalar vibrational data distribution (Curve C) for a typical machine and what a normal distribution (Curve A) and a log normal distribution curve (Curve B) with the same standard distribution would look like.

In FIG. 1, Curve A has the same mean and standard deviation as that calculated from raw data. For example, point D on Curve A has a calculated mean value of 0.0512 in/sec and a calculated standard deviation of 0.0615 in/sec. Point D on Curve A has a mean plus standard deviation of 0.113 in/sec. The normal distribution of Curve A is very broad due to a number of very large measurement values (~23 in/sec) in the distribution curve. The large values may be real values due to the operating environment, or may be "bad" measurements. Accordingly, the standard deviation is unlikely to be an accurate representation of the measurment values. "Bad" measurement values may be difficult to recognize using the normal distribution curve. Curve A is vastly different from Curve C and thus the mean and standard deviation do not represent the actual data in a meaningful way.

Likewise, a log normal distribution curve (Curve B) still does not represent the actual data very well. The log normal distribution curve (Curve B) minimizes the impact of large measurement values by uing the logrithm of the measured values to calculate the mean and standard deviation. Using this method, large measurement values are minimized. For example, Curve B has a calculated mean value of 0.0362 in/sec and a calculated standard deviation of 0.046 in/sec. Point E on Curve B has a log normal mean value plus standard deviation of 0.079 in/sec.

There are two measures for how well a normal distribution represents the actual data. They are: skewness, which is a measure of symmetry, or more precisely, the lack of symmetry. A distribution, or data set, is symmetric if it looks the same to the left and right of the center point. The skewness for a normal distribution is zero.

The other measure is kurtosis which is a measure of whether the data are heavy-tailed or light-tailed relative to a normal distribution. The kurtosis for a standard normal distribution is zero. Positive kurtosis indicates a "heavy-tailed" distribution and negative kurtosis indicates a "light tailed" distribution.

As can be seen in FIG. 1, neither the skewness nor the kurtosis are close to zero; i.e. for Curve A–skewness=7.06 and kurtosis=100.4 and for Curve B–skewness=0.36 and kurtosis=0.38. Skewness and kurtosis are useful for identifying whether or not the mean and standard deviations are a reliable or meaningful representation of the data under evaluation. In general vibrational data is not well represented by skewness and kurtosis as shown by the curves in FIG. 1. Accordingly, there remains a need for a more reliable system and method for setting alarm limit levels for vibrational data for machinery.

In view of the foregoing an embodiment of the disclosure provides a system for setting vibrational alarms for machinery. The system includes a vibrational alarm device having a plurality of vibration data inputs from a machinery group, a memory for storing historical vibration data from the machinery group, an accumulator for generating average vibrational data for the machinery group, a processor for selecting a vibration alarm limit based on a cumulative distribution curve of the average vibrational data, and a warning alarm to alert a user that the machinery has reached the vibrational alarm limit when vibration data from a machine in the machinery group reaches the vibrational alarm limit.

One embodiment of the disclosure provides a hand-held vibration monitor. The vibration monitor has a data input device for inputting vibration data to a central processing unit from a machinery group. The central processing unit has a vibration data storage module for storing the vibration data, a data processor for generating a cumulative distribution curve from the vibration data, and an output for providing an alarm limit. An alarm is provided for alerting a user when the alarm limit is reached by one or more machines in the machinery group.

Another embodiment of the disclosure provides a method for monitoring vibration on a group of machines. The method includes providing a system for setting vibrational alarms for each of the machines in the group of machines. The system includes a vibrational alarm device having a plurality of vibration data inputs from a machinery group, a memory for storing historical vibration data from the machinery group, an accumulator for generating average vibrational data for the machinery group, a processor for selecting a vibration alarm limit based on a cumulative distribution curve of the average vibrational data, and a warning alarm to alert a user that the machinery has reached the vibrational alarm limit when vibration data from a machine in the group of machines reaches the vibrational alarm limit. A user may accept the vibration alarm limit or select a new vibration alarm limit. Data is then input from a matching into the system to determine if the vibration alarm limit is reached.

Some embodiments of the disclosure provide a machinery group that contains machines of similar type, having similar size, located in similar environments, and performing similar functions.

Other embodiments of the disclosure provide that the accumulator is a computer for generating average vibrational data.

Still other embodiments of the disclosure provide that the warning alarm is an audible alarm device. Other embodiments of the disclosure provide that the warning alarm is a visual alarm display.

In some embodiments of the disclosure the system is a portable vibration monitor. In other embodiments of the disclosure vibrational data is input from a sensor attached to the machine.

Other embodiments of the disclosure provide that the vibrational alarm limit is selected from one or more of an advisory alarm limit, a warning alarm limit and a danger alarm limit.

In still other embodiments, the processor is an application specific integrated circuit (ASIC).

An advantage of the systems and methods described herein is that more reliable alarm limits may be established that more closely reflect actual machine vibrational characteristics than can be obtained with prior art curve fitting techniques.

BRIEF DESCRIPTION OF THE DRAWINGS

Further features and advantages of the disclosed embodiments may be evident by reference to the attached drawings in combination with the following disclosure of exemplary embodiments, wherein.

DETAILED DESCRIPTION OF EXEMPLARY EMBODIMENTS

In view of the problems with conventional techniques used to set alarm limits for machines, a more reliable approach is to use a cumulative distribution which is not dependent on any particular type of distribution. Using a cumulative distribution, one is able to more accurately establish alarm limit levels.

A critical factor in statistically evaluating and setting alarm limit levels is the grouping of the data from various machines together to create a sufficiently large data set for statistical analysis. Grouping of machines involves identifying "Like" machines such as motors, pumps, fans, compressors, etc. that have common characteristics. The "Like" machines are further segregated by other parameters such as size, horsepower, speed, industrial use, environmental conditions, age, and the like. Another approach is to statistically establish alarm limit levels for individual machines. However, there is often insufficient data for a machine or a particular machine may be in perfect working order and therefore one cannot statistically establish, for example, a danger alarm level because there is no data representing that state. In practice, a combination of machine grouping and statistically establishing alarm limits may yield the best results for setting various alarm limits.

A cumulative distribution curve plots the cumulative percentage of measurements for a given value (Y-Axis) as a function of the measured values (X-Axis). The total number of measurements equals 100%. The cumulative distribution function of a real-valued random variable X is the function given by $F(X)(x)=P(X \leq x)$, where the right-hand side represents the probability that the random variable X takes on a value less than or equal to x. The probability that X lies in the semi-closed interval (a, b), where a<b, is therefore $P(a<X \leq b)=F_X(b)-F_X(a)$.

Figure 1:
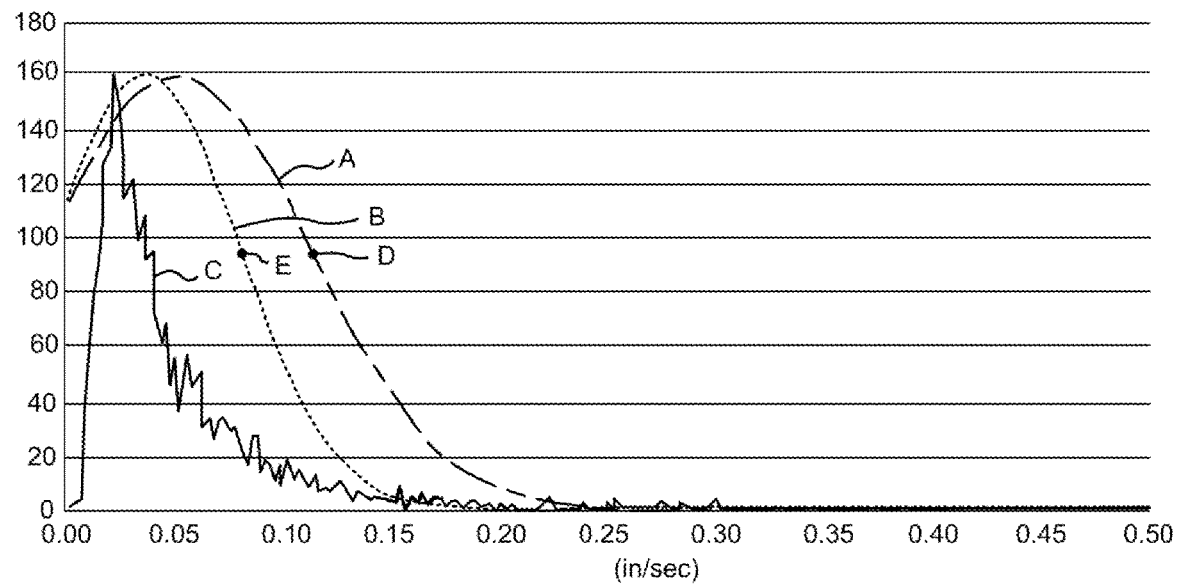
FIG. 1 is a graphical illustration of actual vibrational data versus prior art normal and log normal vibration distribution curves.
Figure 2:
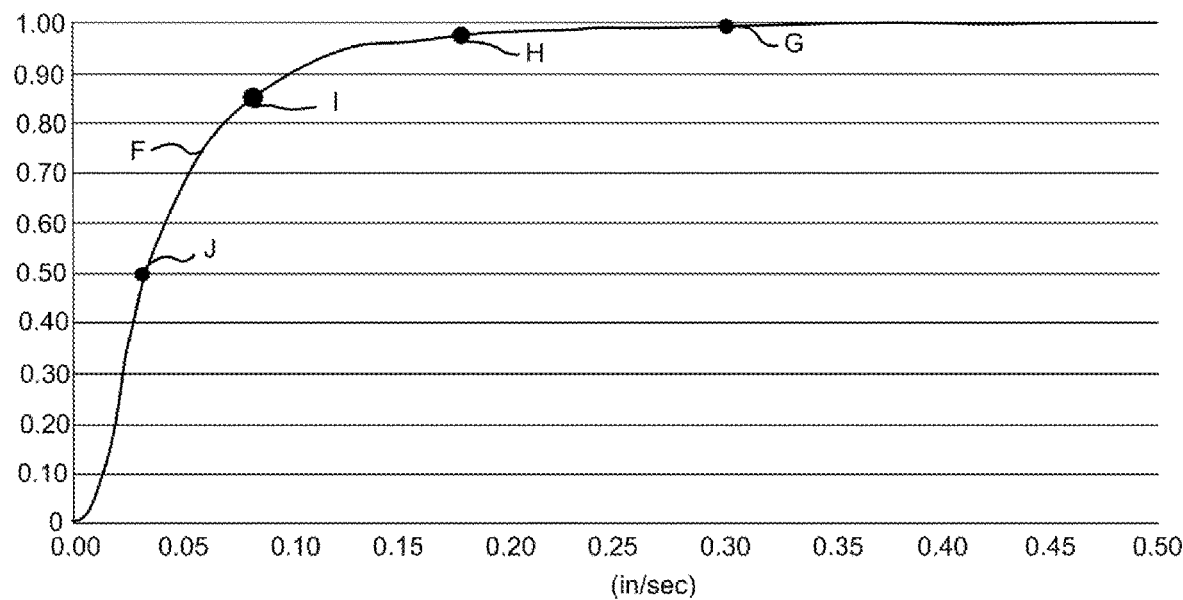
FIG. 2 is a graphical illustration of a cumulative distribution curve according to an embodiment of the disclosure.

FIG. 2 is a graphical illustration of a cumulative distribution curve F according to an embodiment of the disclosure. FIG. 2 shows the cumulative distribution of overall vibration values in in/sec for 3195 measurements on the axial sensor position for a group of motors that have characteristics in common. Alarm limit levels are set to values based on the percentage of measurements, and thereby the percentage of motors that could be in that alarm state at any given time. Accordingly, in FIG. 2, the "Danger" alarm limit level is set at 99% (i.e. 1% of the measurements are above this value) which equates to an overall vibration level of 0.3 in/sec (Point G on Curve F). A "Warning" alarm limit is set at 97% which equates to an overall vibration level of 0.18 in/sec (Point H on Curve F). An "Advise" alarm limit level is set at 84% which equates to 0.08 in/sec (Point I on Curve F). Half of the measured values occur at 0.036 in/sec (Point J on Curve F) which is the same as the median average value of the vibrational data. By comparison, a normal distribution average of the data is 0.051 in/sec, a normal distribution mean plus standard deviation is 0.113 in/sec and a log normal distribution mean plus standard deviation is 9.079 in/sec. Thus the mean and standard deviations are quite different from the alarm levels determined by the cumulative distribution curve F.

Figure 3:
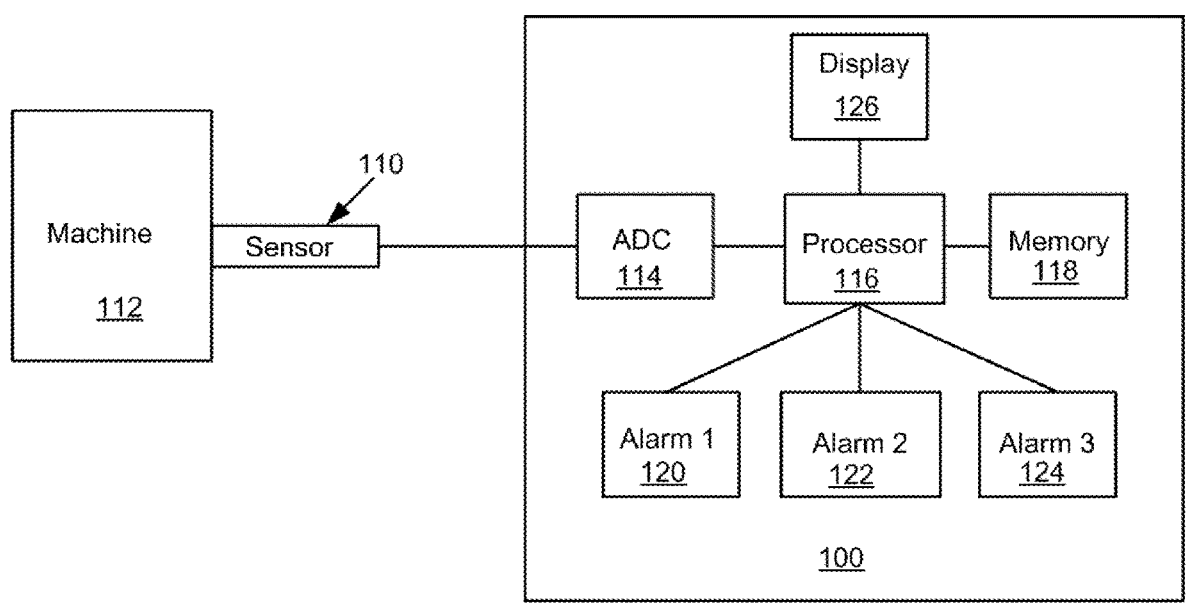
FIG. 3 is a schematic representation of a vibrational analyzer system according to an embodiment of the disclosure.

A system 100 for setting alarm limits from vibration sensors 110 from a group of machines 112 using cumulative distributions according to the disclosure is shown schematically in FIG. 3. The system 100 includes an analog to digital converter (ADC) 114 to convert the vibration data to a digital input, a processor 116 to handle input of vibrational data from the ADC 114 and to store the data in a data storage or memory device 118. The vibration data input and stored data are then evaluated using a cumulative distribution function to provide and update alarm levels, such as Alarm 1 (120), Alarm 2 (122) and Alarm 3 (124). The system 100 may be a portable or hand-held vibration monitor, a portable computer or a desktop or main-frame computer. A visual and/or audible display 126 is provided in the system to notify the user of changes to the alarm limits.

Figure 4:
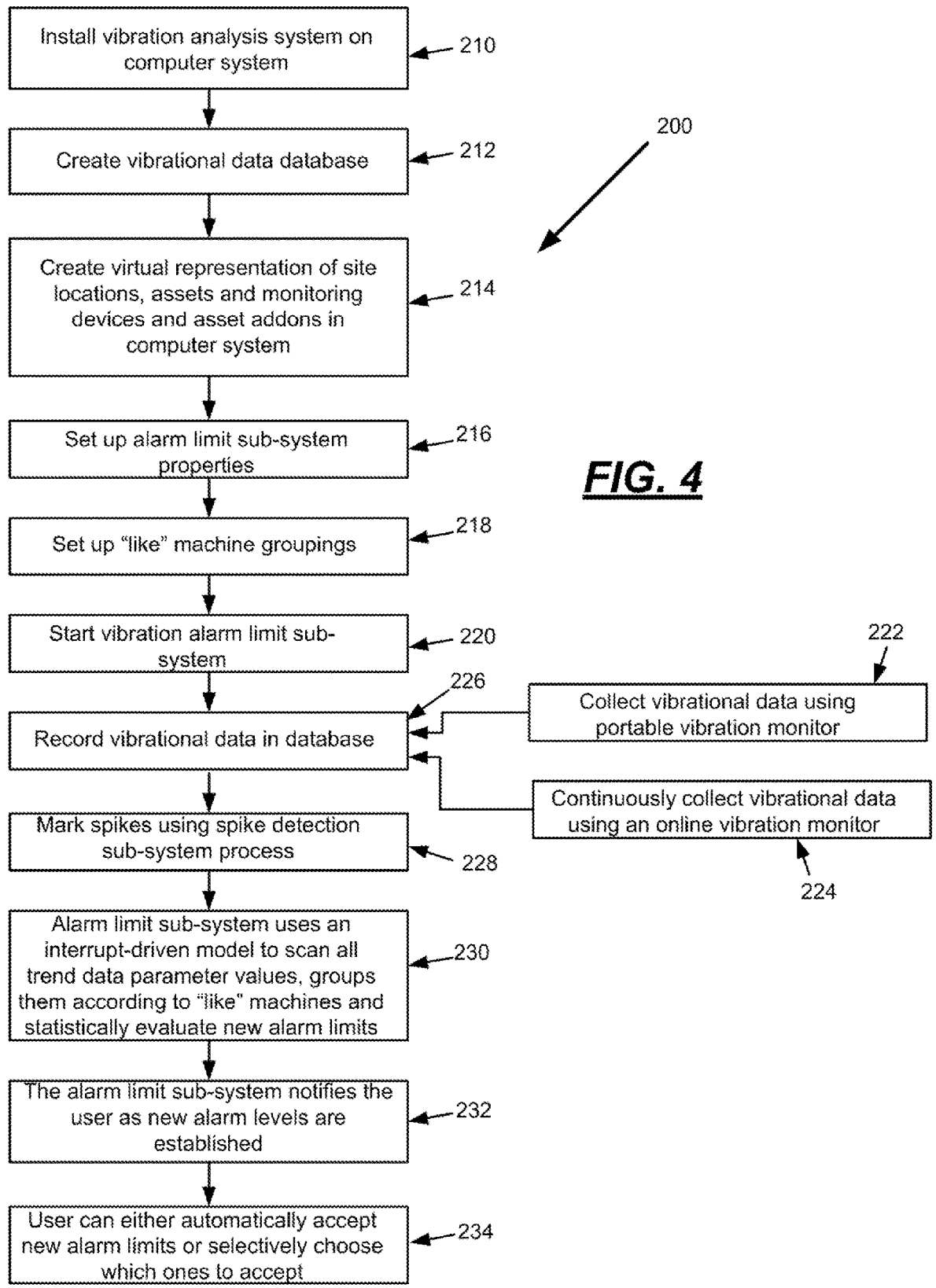
FIG. 4 is a block flow diagram of a method for setting alarm limits according to the disclosure.

A procedure 200 for setting alarm limits using commutative distributions is illustrated in block diagram in FIG. 4. As an initial step 210, a cumulative distribution vibrational analysis system is installed on the hand-held, lap-top, desktop, or main-frame computer 100. In step 212, a vibrational data database is created in the memory 118 of the computer 100 to hold data from a group of machines. Next, in step 214, a virtual representation of each machine is created in the computer memory 118 to show the location and type of machine and monitoring devices and locations on each machine. Likewise, alarm sub-system properties are created in step 216 in the computer memory 118. In step 218, groups of "Like" machines are defined to segregate vibration data into data sets for analysis so that the resulting analysis is relevant to all of the machines in the group of "Like" machines.

Once the machine groupings and alarm sub-system properties are created, the vibration alarm limit sub-system is started in step 220. Vibrational data is collected in step 222 from a portable vibration monitoring device (step 222) and/or from online, or continuous vibration monitors (step 224) and is input into the vibrational analysis system 200 and recorded in the database (step 226) of the system. Data spikes in the collected data are marked using a spike detection sub-system process in step 228 which also determines statistically if the spikes should remain or be removed from the data. The system continually runs in the background and creates cumulative distributions for each vibration parameter data set as new vibration data is recorded and input into the system in step 226.

A data "spike" is defined as a change in a measured value which is unreasonable due to rate of change from previous values, difference in magnitude from previous values, or both. Typically, the "spike" is of short duration, and appears as a very sharp positive or negative excursion on a processed data plot.

Raw vibration data collected from vibration monitors may be subject to a variety of noise inputs which may manifest as spikes in the processed data. These noise inputs can arise from poor wiring installations, bad cables to vibration sensors, static electric discharges, electromagnetic pickup from external sources such as a noisy electric motor or some other source of electromagnetic radiation. There could also be other sources of noise which produce spikes in the input vibrational data.

It should be noted that some spikes in the processed data may be legitimate changes in vibration levels or harmonic content due to some sort of fault with the machine 112 being monitored. In general, there are most often other indications (such as a steady increase in trended values) that something is changing in the behavior of the machine 112.

Spikes in the real-time or historical vibration data can lead to false alarms being generated. Conversely, if historical data is being used to set alarm limits, spikes in the data may result in alarm limits that are too loose, which may result in problems being missed or being alerted to problems too late.

In order to reduce the impact of data spikes an algorithm has been developed to detect the spikes. Once detected, the spikes may be temporarily or permanently removed from the data set in step 228.

Step 230 of the process provides an alarm limit sub-system that uses an interrupt-driven model to scan all trend data parameter values and group them according to "Like" machines so that new alarm limits may be statistically evaluated for each machine grouping. Using cumulative distributions, as described above, the system evaluates the alarm limit levels based on defined percentiles for each data set ("Like" machines) and for each vibration parameter type that is recorded for like machines. Typical alarm limits include at least three alarm levels, e.g., 84% for an advise level alarm, 97% for a waning level alarm, and 99% for a danger level alarm.

In step 232, the alarm limit sub-system provided by step 230 automatically notifies a user either visually or audibly or both visually and audibly when new alarm limit levels are established by the system for the group of machines. In step 234, the user can either automatically accept the new alarm limits or can selectively choose which new alarm limits will be accepted.

It is contemplated, and will be apparent to those skilled in the art from the preceding description and the accompanying drawings, that modifications and changes may be made in the embodiments of the disclosure. Accordingly, it is expressly intended that the foregoing description and the accompanying drawings are illustrative of exemplary embodiments only, not limiting thereto, and that the true spirit and scope of the present disclosure be determined by reference to the appended claims.

What is claimed is:

1. A system for setting vibrational alarms for machinery, the system comprising:
    a vibrational alarm device having,
        a plurality of vibration data inputs from a machinery group, wherein the machinery group comprises machines of similar type, having similar size, located in similar environments, and performing similar functions,
        a memory for storing historical vibration data from the machinery group,
        an accumulator for generating average vibrational data for the machinery group,
        a processor for selecting a vibration alarm limit based on a cumulative distribution curve of the average vibrational data, and
        a warning alarm to alert a user that the machinery has reached the vibrational alarm limit when vibration data from a machine in the machinery group reaches the vibrational alarm limit.

2. The system of claim 1, wherein the accumulator comprises a computer for generating average vibrational data.

3. The system of claim 1, wherein the warning alarm comprises an audible alarm device.

4. The system of claim 1, wherein the warning alarm comprises a visual alarm display.

5. The system of claim 1, wherein the system comprises a portable vibration monitor.

6. The system of claim 1, wherein the vibrational alarm limit is selected from the group consisting of one or more of an advisory alarm limit, a warning alarm limit and a danger alarm limit.

7. The system of claim 1, wherein the processor comprises an application specific integrated circuit (ASIC).

8. A hand-held vibration monitor comprising:
    a vibration data input device for inputting vibration data to a central processing unit from a machinery group,
        wherein the central processing unit has a vibration data storage module for storing the vibration data,
        wherein the machinery group comprises machines of similar type, having similar size, located in similar environments, and performing similar functions,
    a data processor for generating a cumulative distribution curve from the vibration data, and
    an output for providing an alarm limit; and
    an alarm for alerting a user when the alarm limit is reached by one or more machines in the machinery group.

9. The hand-held vibration monitor of claim 8, wherein a machinery group comprises machines of similar type, having similar size, located in similar environments, and performing similar functions.

10. The hand-held vibration monitor of claim 8, wherein the alarm comprises an audible alarm device.

11. The hand-held vibration monitor of claim 8, wherein the alarm comprises a visual alarm display.

12. The hand-held vibration monitor of claim 8, wherein the vibrational alarm limit is selected from the group consisting of one or more of an advisory alarm limit, a warning alarm limit and a danger alarm limit.

13. The hand-held vibration monitor of claim 8, wherein the data processor comprises an application specific integrated circuit (ASIC).

14. A method for monitoring vibration on a group of machines comprising,
setting vibrational alarms for each of the machines in the group of machines, by,
accessing vibration data from a machinery group, wherein the machinery group comprises machines of similar type, having similar size, located in similar environments, and performing similar functions,
storing historical vibration data from the machinery group,
generating average vibrational data for the machinery group,
selecting a vibration alarm limit based on a cumulative distribution curve of the average vibrational data, and
alerting a user when vibration data from a machine in the group of machines reaches the vibrational alarm limit;
accepting the vibration alarm limit or selecting a new vibration alarm limit; and
inputting vibrational data from a machine into the system to determine if the vibration alarm limit is reached.

15. The method of claim 14, wherein the vibrational data is input from a hand-held vibration monitor.

16. The method of claim 14, wherein the vibrational data is input from a vibrational input attached to the machine.

17. The method of claim 14, further comprising setting an advisory alarm limit, a warning alarm limit and a danger alarm limit for each machine in the group of machines.

18. The method of claim 14, wherein the processor is an application specific integrated circuit (ASIC).

\* \* \* \* \*